(12) United States Patent
Li et al.

(10) Patent No.: US 12,155,094 B2
(45) Date of Patent: Nov. 26, 2024

(54) SECONDARY BATTERY, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Zhoufu Li, Ningde (CN); Daichun Tang, Ningde (CN); Xigui Long, Ningde (CN); Xiaoxi Zhang, Ningde (CN); Baiqing Li, Ningde (CN); Lingyan Jiang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 992 days.

(21) Appl. No.: 17/145,613

(22) Filed: Jan. 11, 2021

(65) Prior Publication Data

US 2021/0135325 A1    May 6, 2021

Related U.S. Application Data

(63) Continuation of application No. PCT/CN2020/085486, filed on Apr. 19, 2020.

(30) Foreign Application Priority Data

May 21, 2019    (CN) .......................... 201920735006.1

(51) Int. Cl.
*H01M 50/70*    (2021.01)
*H01M 10/052*   (2010.01)
(Continued)

(52) U.S. Cl.
CPC ......... *H01M 50/70* (2021.01); *H01M 10/052* (2013.01); *H01M 10/0585* (2013.01); *H01M 50/147* (2021.01); *H01M 50/533* (2021.01)

(58) Field of Classification Search
None
See application file for complete search history.

(56) References Cited

U.S. PATENT DOCUMENTS

| 2011/0159356 A1* | 6/2011 | Tozuka | ............ | H01M 10/0431 |
| | | | | 429/179 |
| 2012/0237810 A1* | 9/2012 | Sasaki | ................. | H01M 50/538 |
| | | | | 429/94 |

(Continued)

FOREIGN PATENT DOCUMENTS

| CN | 101872870 A | 10/2010 |
| CN | 206574809 U | 10/2017 |

(Continued)

OTHER PUBLICATIONS

International Search Report issued on Jul. 8, 2020 in corresponding International application No. PCT/CN2020/085486; 5 pages.

(Continued)

*Primary Examiner* — Haroon S. Sheikh
*Assistant Examiner* — Claire A Rutiser
(74) *Attorney, Agent, or Firm* — Kilpatrick Townsend & Stockton LLP

(57) ABSTRACT

A secondary battery, a battery pack, and an electric device. The secondary battery includes: a case with an inner cavity in which an electrolyte is included; a cap assembly covering an opening of the case; and an electrode assembly located in the inner cavity, the electrode assembly including an electrode unit and tabs, and along a length direction, the electrode unit including two side portions disposed oppositely, the tabs extending from the side portions; a connecting component configured to connect the tabs and the cap assembly; a flow guiding component located between a corresponding connecting component and a corresponding side portion, being connected to the connecting component and provided with an avoiding portion configured to avoid (Continued)

the tabs, and being in contact with the electrolyte, at least part of the flow guiding component being in contact with the corresponding side portion, and the flow guiding component.

12 Claims, 6 Drawing Sheets

(51) Int. Cl.
*H01M 10/0585* (2010.01)
*H01M 50/147* (2021.01)
*H01M 50/533* (2021.01)

(56) References Cited

U.S. PATENT DOCUMENTS

2013/0316197 A1* 11/2013 Tilley .................... H01G 11/14
429/61

2015/0024244 A1* 1/2015 Tsutsumi ............... H01G 11/84
29/25.03
2015/0270527 A1* 9/2015 Sasaki ................ H01M 50/176
429/179
2019/0044103 A1* 2/2019 Ogawa ................ H01M 50/533

FOREIGN PATENT DOCUMENTS

| | | |
|---|---|---|
| CN | 208819970 U | 5/2019 |
| CN | 209675429 U | 11/2019 |
| JP | 2018-92814 A | 6/2018 |
| WO | 2017/045732 A1 | 3/2017 |

OTHER PUBLICATIONS

Extended Europen Search Report issued on Aug. 5, 2021 in corresponding International application No. PCT/CN2020/085486; 6 pages.

* cited by examiner

SECONDARY BATTERY, BATTERY PACK AND ELECTRIC DEVICE

CROSS-REFERENCE TO RELATED APPLICATION

The present application is a continuation of International Application No. PCT/CN2020/085486, filed on Apr. 19, 2020, which claims priority to Chinese Patent Application No. 201920735006.1, filed on May 21, 2019 to China National Intellectual Property Administration and entitled "SECONDARY BATTERY", which is incorporated herein by reference in its entirety.

TECHNICAL FIELD

The present application relates to the technical field of energy storage devices, and in particular, to a secondary battery, a battery pack and an electric device.

BACKGROUND

A secondary battery includes a case and an electrode assembly, and an electrolyte is accommodated in the case, and the electrolyte can infiltrate the electrode assembly, thereby prolonging a service life of the secondary battery. The electrode assembly includes a body and a tab. For a structure where the tab extends from a side portion of the body, it is difficult for the electrolyte to infiltrate the electrode assembly from bottom. After the secondary battery works for a long time, an interior of the electrode assembly lacks the electrolyte, and electrolyte wettability of the secondary battery is poor, and a lithium precipitation phenomenon is prone to occur, which affects the service life of the secondary battery.

SUMMARY

In view of the above, embodiments of the present application provide a secondary battery, a battery pack, and an electric device. The secondary battery could be used to solve a problem in the prior art that poor electrolyte wettability of the secondary battery leads to a low service life of the secondary battery.

The embodiments of the present application provide a secondary battery, and the secondary battery includes:

a case, including an opening and an inner cavity, an electrolyte being included in the inner cavity;

a cap assembly, covering the opening.

an electrode assembly, located in the inner cavity and including an electrode unit and tabs; along a length direction, the electrode unit including two side portions disposed oppositely, and the tabs extending from the side portions;

connecting components, configured to connect the tabs and the cap assembly; and a flow guiding component, located between a corresponding connecting component and a corresponding side portion and connected to the corresponding connecting component, at least part of the flow guiding component being in contact with the corresponding side portion, and the flow guiding component being in contact with the electrolyte;

where the flow guiding component is provided with an avoiding portion configured to avoid the tabs.

Optionally, each of the tabs includes a body portion and an extension portion, the body portion extends from the corresponding side portion, and the extension portion is bent relative to the body portion.

At least part of the body portion is located in the avoiding portion.

Optionally, the flow guiding component is a plate-shaped structure.

Along a width direction, one end of the flow guiding component is fixedly connected to the corresponding connecting component, and the other end is attached to the corresponding side portion.

Optionally, along the width direction, a width of the flow guiding component is smaller than a width of the connecting components.

Optionally, along a height direction, a height of the flow guiding component is greater than or equal to a height of the electrode assembly.

Each of the connecting components includes a first connecting portion and a second connecting portion, the first connecting portion is configured to connect to the cap assembly, and the second connecting portion is configured to connect to a tab, and the first connecting portion is bent relative to the second connecting portion.

Along the height direction, one end of the flow guiding component extends to a position where the first connecting portion and the second connecting portion are bent relative to each other, and the other end of the flow guiding component abuts against a bottom of the case; or the secondary battery further includes an insulating membrane located between the case and the electrode assembly, and along the height direction, one end of the flow guiding component extends to the position where the first connecting portion and the second connecting portion are bent relative to each other, and the other end of the flow guiding component abuts against a bottom of the insulating membrane.

Optionally, the electrode assembly includes a plurality of anodic plates, a plurality of cathodic plates and a plurality of separators, and the separators are located between the anodic plates and the cathodic plates that are adjacent.

Along the width direction, each of the separators includes first end portions that extend beyond the anodic plates and the cathodic plates.

A thickness of the flow guiding component is greater than or equal to a distance between a first end portion and a connecting component corresponding thereto.

Optionally, the flow guiding component includes an anode flow guiding component and a cathode flow guiding component, where the anode flow guiding component and the cathode flow guiding component are respectively located on two sides of the electrode assembly along the width direction.

At a cathode of the electrode assembly, each of the cathodic plates includes a third end portion that extends beyond the anodic plates, and along the width direction, the third end portion is located between a first end portion and the anodic plates.

A first thickness $D_1$ of the cathode flow guiding component satisfies $D_1 \leq d_1 + d_2$;

where $d_1$ is the distance between a first end portion and a connecting component corresponding thereto, and $d_2$ is a distance between the third end portion and a first end portion that is close to the third end portion.

Optionally, the flow guiding component includes an anode flow guiding component and a cathode flow guiding component, where the anode flow guiding component and the cathode flow guiding component are respectively located on two sides of the electrode assembly along the width direction.

At an anode of the electrode assembly, each of the anode plates includes a second end portion that extends beyond the cathodic plates, and along the width direction, the second end portion is located between the cathodic plates and the first end portion.

A second thickness $D_2$ of the anode flow guiding component satisfies $D_2 \leq d_1$ $d_3$, where $d_1$ is the distance between a first end portion and a connecting component corresponding thereto, and $d_3$ is a distance between the second end portion and a first end portion that is close to the second end portion.

Optionally, a thickness d of the flow guiding component satisfies a following formula:

$$d=(L_1 \times W_1 \times G - L_2 \times W_2 \times \rho_1)/(\rho_2 \times H_3 \times (W_3-1)) \quad (1)$$

where $L_1$ is a total length of the anodic plates or a total length of the cathodic plates; $W_1$ is a width of an active material layer of the anodic plates or a width of an active material layer of the cathodic plates;

G is a distance between the anodic plates that are adjacent, or a distance between the cathodic plates that are adjacent;

$L_2$ is a total length of the separators; $W_2$ is a width of the separators;

$H_3$ is a height of the electrode assembly; $W_3$ is a width of the connecting components;

$\rho_1$ is a liquid retention coefficient of the separators; $\rho_2$ is a liquid retention coefficient of the flow guiding component.

Optionally, the avoiding portion is a recess.

Along the height direction, the recess includes a first side wall and a second side wall disposed oppositely, and the first side wall and the second side wall abut against the body portion, respectively.

Along the width direction, the recess includes a third side wall, and the third side wall abuts against the body portion.

Embodiments of the present application also provide a battery pack including a secondary battery as described above.

Embodiments of the present application also provide an electric device, including a secondary battery as described above.

In the present application, after the flow guiding component is provided, part of the electrolyte injected into the accommodating cavity of the case could be absorbed by the flow guiding component, and the electrolyte could diffuse in the flow guiding component. Since the flow guiding component is in contact with the electrode unit of the electrode assembly, the electrolyte in the flow guiding component which is in contact with the electrode unit enters the electrode unit as the electrolyte inside the electrode unit is consumed, and thus the electrolyte in the accommodating cavity could be continuously passed into the electrode unit, the electrolyte wettability in the electrode assembly could be improved, the risk of lithium precipitation for the electrode assembly could be reduced, and the service life of the secondary battery could be improved. Meanwhile, when the secondary battery swells during operation, the electrode assembly and the case could compress the flow guiding component, so that the flow guiding component could release the electrolyte stored therein, the liquid retention capacity of the secondary battery could be improved and the service life of the secondary battery could be further improved.

At the same time, after the flow guiding component is provided with the avoiding portion, the tab could be avoided, that is, the tab could extend through the avoiding portion, so that fixed connection between the tab and the connecting component could be realized.

DESCRIPTION OF EMBODIMENTS

Figure 1:
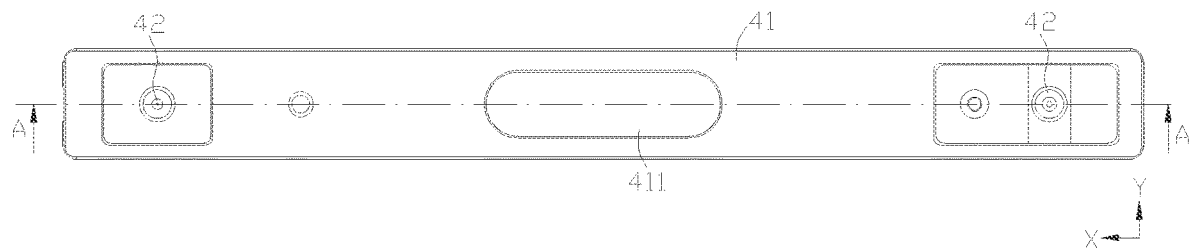
FIG. 1 is a top view of a secondary battery provided by the present application in a specific embodiment.

For a better understanding on the technical solutions of the present application, embodiments of the present application are described in detail below with reference to the accompanying drawings.

It should be clear that the described embodiments are only part of the embodiments of the present application, rather than all the embodiments. Based on the embodiments in the present application, all other embodiments obtained by a person of ordinary skill in the art without creative effort shall fall within the protection scope of the present application.

The terms used in the embodiments of the present application are only for the purpose of describing specific embodiments, but are not intended to limit the present application. The singular forms of "a", "description" and "the" used in the embodiments of the present application and the appended claims are also intended to include plural forms, unless the context clearly indicates other meanings.

It should be understood that the term "and/or" used herein is only an association relationship describing associated objects, which means that there may be three types of relationships; for example, A and/or B can mean that there are three cases: A exists alone, both A and B exist, and B exists alone. In addition, the character "/" in this text generally indicates that the associated objects before and after are in an "or" relationship.

It should be noted that the "upper", "lower", "left", "right" and other directional words described in the embodiments of the present application are described from an angle shown in the drawings, and should not be construed as any limitation to the embodiments of the present application. In addition, in the context, it also needs to be understood that when it is mentioned that an element is connected "above" or "under" another element, it can not only be directly connected "above" or "under" the other element, but also be indirectly connected "above" or "under" another element through an intermediate element.

Figure 2:
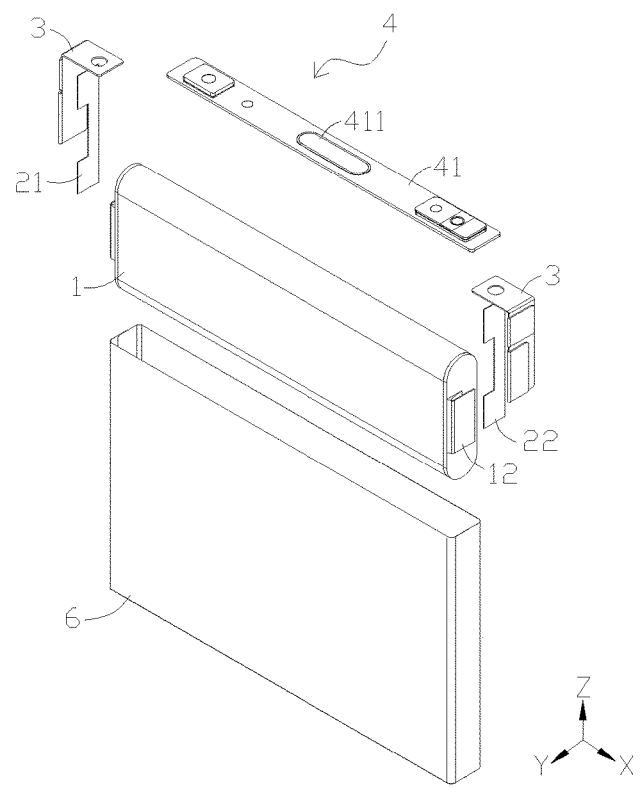
FIG. 2 is an exploded diagram of FIG. 1.
Figure 3:
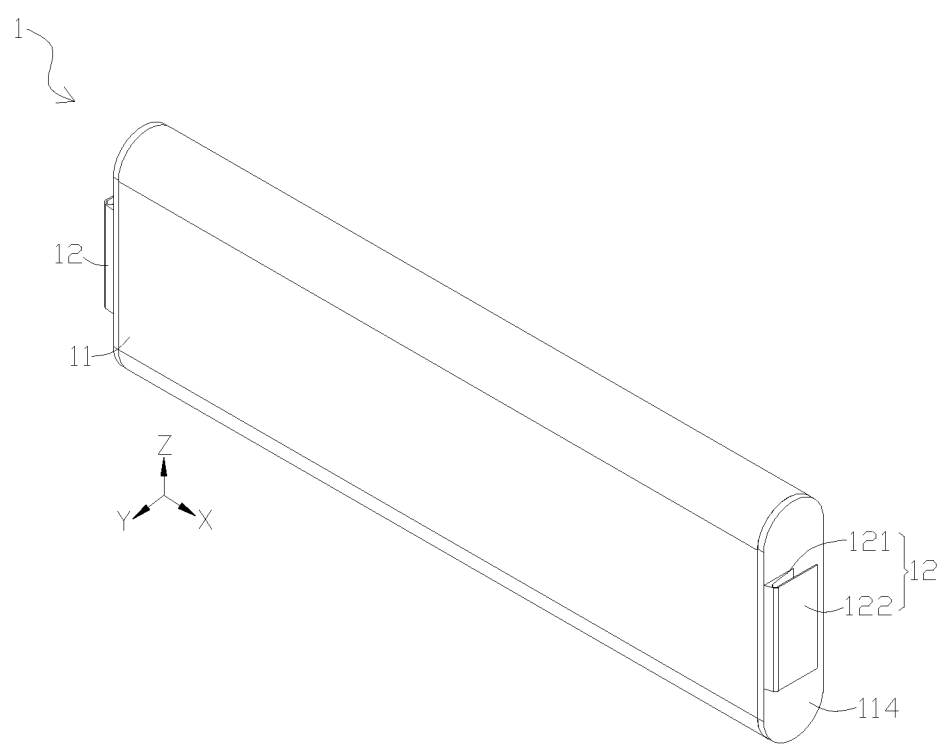
FIG. 3 is a schematic structural diagram of an electrode assembly in FIG. 2.
Figure 4:
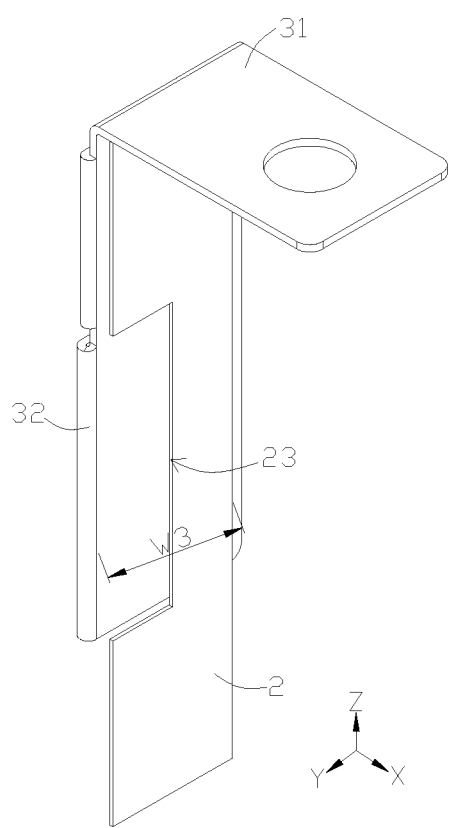
FIG. 4 is a schematic structural diagram showing a connection between a connecting component and a flow guiding component in FIG. 2.
Figure 5:
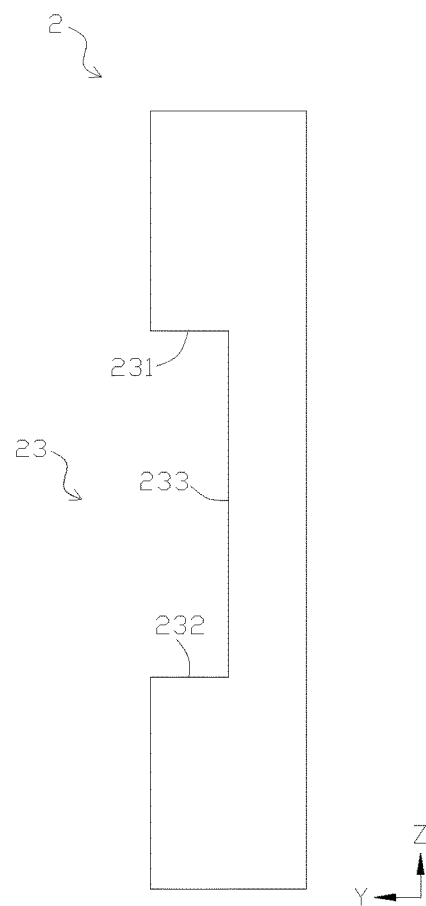
FIG. 5 is a schematic structural diagram of the flow guiding component in FIG. 4.
Figure 6:
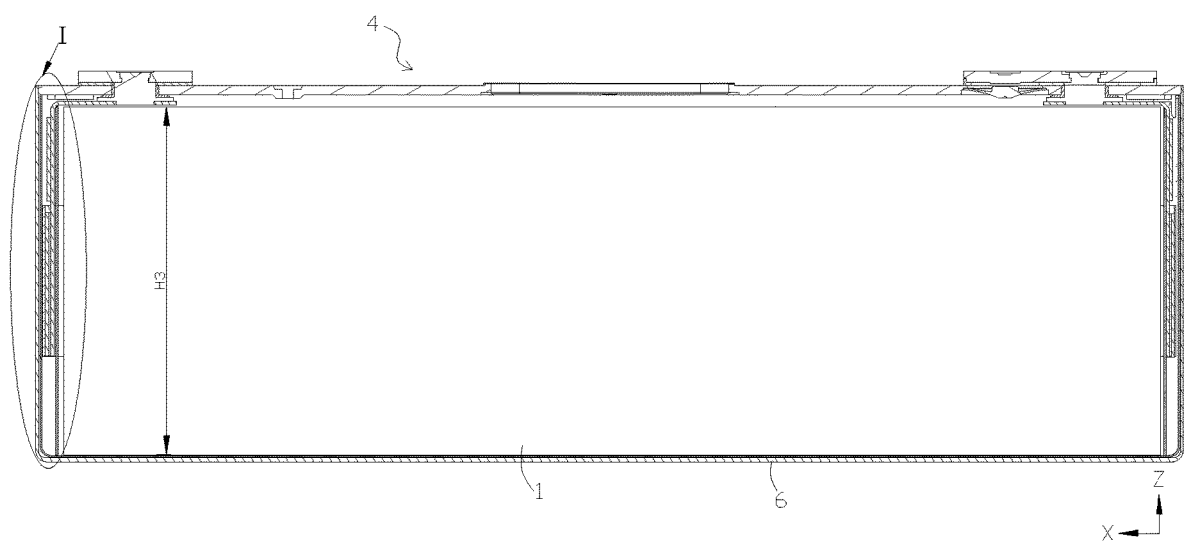
FIG. 6 is a sectional view taken along a line A-A of FIG. 1.
Figure 7:
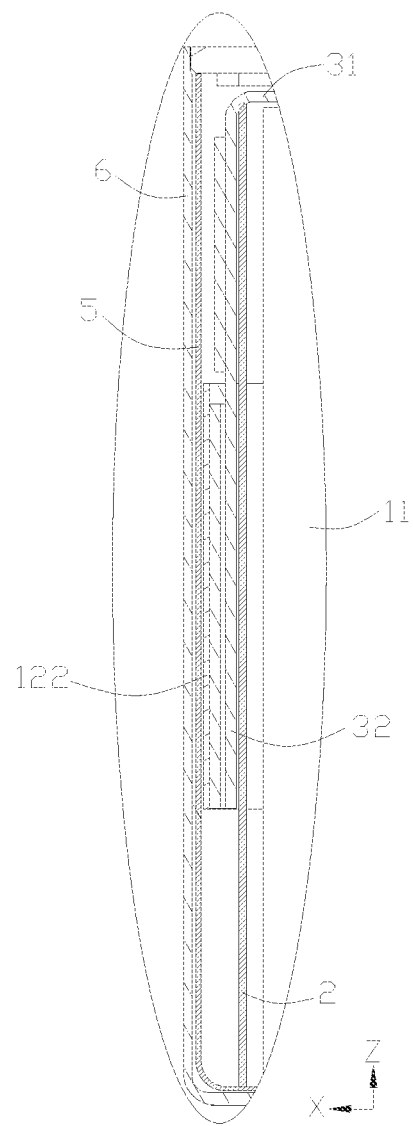
FIG. 7 is a partial enlarged diagram of part I in FIG. 6.
Figure 8:
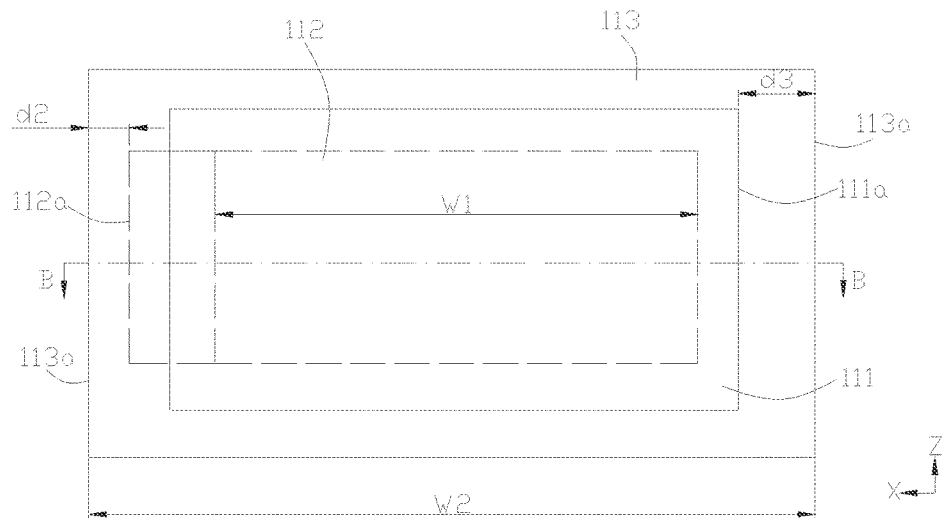
FIG. 8 is a schematic diagram of a cathodic plate, an anodic plate and a separator in FIG. 3.
Figure 9:
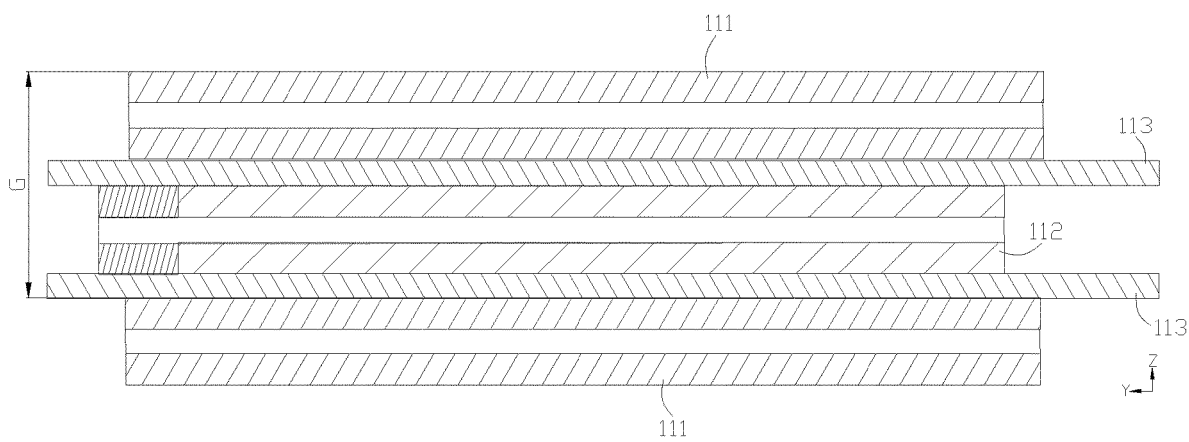
FIG. 9 is a sectional view taken along a line B-B of FIG. 8.

Please refer to FIG. 1 to FIG. 7, where FIG. 1 is a top view of a secondary battery provided by the present application in a specific embodiment; FIG. 2 is an exploded diagram of FIG. 1; FIG. 3 is a schematic structural diagram of an electrode assembly in FIG. 2; FIG. 4 is a schematic structural diagram showing a connection between a connecting component and a flow guiding component in FIG. 2; FIG. 5 is a schematic structural diagram of the flow guiding component in FIG. 4; FIG. 6 is a sectional view taken along a line A-A of FIG. 1; FIG. 7 is a partial enlarged diagram of part I in FIG. 6; FIG. 8 is a schematic diagram of a cathodic plate, an anodic plate and a separator in FIG. 3; FIG. 9 is a sectional view taken along a line B-B of FIG. 8.

An embodiment of the present application provides a secondary battery. As shown in FIG. 1 and FIG. 2, the secondary battery includes an electrode assembly 1, a cap assembly 4, and a case 6. The case 6 may be a hexahedral shape or other shapes, and the case 6 forms an accommodating cavity configured to accommodate the electrode assembly 1 and an electrolyte. One end of the case 6 is provided with an opening so that the electrode assembly 1 could be placed into the accommodating cavity of the case 6 through the opening. The case 6 may include a metal material, such as aluminum or aluminum alloy, and may also include an insulating material, such as plastic.

As shown in FIG. 3, the electrode assembly 1 includes an electrode unit 11 and tabs 12. The electrode unit 11 includes two side portions 114 disposed oppositely along a length direction X. In the secondary battery, the two tabs 12 extend from the two side portions 114 of the electrode unit 11, respectively. As shown in FIG. 8, the electrode unit 11 includes an anodic plate 111, a cathodic plate 112, and a separator 113, where the separator 113 is located between the adjacent anodic plate 111 and the cathodic plate 112 to space the anodic plate 111 from the cathodic plate 112.

In a specific embodiment, the anodic plate 111, the separator 113, and the cathodic plate 112 are sequentially stacked and wound to form the electrode unit 11 of the electrode assembly 1. That is, the electrode unit 11 has a winding structure. In a second specific embodiment, the anodic plate 111, the separator 113, and the cathodic plate 112 are sequentially stacked to form the electrode unit 11 of the electrode assembly 1, and the electrode unit 11 has a laminated structure. At the same time, there are gaps after the electrode unit 11 is formed, and the electrolyte could enter the electrode unit 11 through the gaps to infiltrate the anodic plate 111 and the cathodic plate 112.

The anodic plate 111 includes an anode current collector (e.g., copper foil) and an anode active material layer (e.g., graphite, carbon or silicon) coated on a surface of the anode current collector. The cathodic plate 112 includes a cathode current collector (e.g., aluminum foil) and a cathode active material layer (e.g., a ternary material, lithium iron phosphate, or lithium cobaltate) coated on a surface of the cathode current collector. At an anode of the electrode assembly 1, the tab 12 is connected to the anodic plate 111 and extends from the electrode unit 11, and the tab 12 may be directly formed from the anode current collector by cutting. At a cathode of the electrode assembly 1, the tab 12 is connected to the cathodic plate 112 and extends from the electrode unit 11, and the tab 12 may be directly formed from the cathode current collector by cutting.

As shown in FIG. 1 and FIG. 2, the cap assembly 4 includes a cap plate 41 and electrode terminals 42, the cap plate 41 is fixed to the opening of the case 6, thereby sealing the electrode assembly 1 and the electrolyte in the accommodating cavity of the case 6. The electrode terminals are arranged on the cap plate 41 and include an anode electrode terminal and a cathode electrode terminal. The anode electrode terminal and the cathode electrode terminal are respectively electrically connected to a corresponding tab 12 through a connecting component 3, and the cap plate 41 is provided with an explosion-proof opening 411.

Further, as shown in FIG. 2 and FIG. 4, the secondary battery further includes a flow guiding component 2 located in the accommodating cavity of the case 6. The flow guiding component 2 can absorb the electrolyte and includes an anode flow guiding component 21 and a cathode flow guiding component 22. At least part of the flow guiding component 2 is in contact with a corresponding side portion 114, and the two flow guiding components 2 are in contact with the electrolyte. In the embodiment, as shown in FIG. 2, the two flow guiding components 2 of the secondary battery have a split structure, and there is no connecting part between the two.

As shown in FIG. 5, the flow guiding component 2 is provided with an avoiding portion 23, and the avoiding portion 23 is configured to avoid the tab 12.

In the present application, after the flow guiding component 2 is provided, part of the electrolyte injected into the accommodating cavity of the case 6 could be absorbed by the flow guiding component 2, and the electrolyte could diffuse in the flow guiding component 2. Since the flow guiding component 2 is in contact with the electrode unit 11 of the electrode assembly 1, the electrolyte in the flow guiding component 2 which is in contact with the electrode unit 11 enters the electrode unit 11 as the electrolyte in the electrode unit 11 is consumed, and thus the electrolyte in the accommodating cavity could be continuously passed into the electrode unit 11, the electrolyte wettability in the electrode assembly 1 could be improved, the risk of lithium precipitation for the electrode assembly 1 could be reduced, and the service life of the secondary battery could be increased. Meanwhile, when the secondary battery swells during operation, the electrode assembly 1 and the case 6 could compress the flow guiding component 2, so that the flow guiding component 2 could release the electrolyte stored therein, the liquid retention capacity of the secondary battery could be improved, and the service life of secondary battery could be further improved.

At the same time, after the flow guiding component 2 is provided with the avoiding portion 23, the tab 12 could be avoided, that is, the tab 12 could extend through the avoiding portion 23, so as to realize fixed connection between the tab 12 and the connecting component 3. In addition, when the connection between the tab 12 and the connecting component 3 is a welded connection, the arrangement of the avoiding portion 23 could also reduce a risk of damaging the flow guiding component 2 by heat during a welding process, and improve the service life of the flow guiding component 2 and the secondary battery.

As shown in FIG. 4, the connecting component 3 includes a first connecting portion 31 and a second connecting portion 32, where the first connecting portion 31 extends to a top of the electrode assembly 1 for connecting to the cap assembly 4. The second connecting portion 32 extends to a side portion of the electrode assembly 1 for connecting to the tab 12.

Further, as shown in FIG. 3, the tab 12 includes a body portion 121 and an extension portion 122, where the body portion 121 extends from the side portion 114 of the electrode unit 11, and the extension portion 122 extends from the electrode unit 11 and then bends, that is, the extension portion 122 is bent relative to the body portion 121, where the body portion 121 and the cap assembly 4 are connected by the connecting component 3. At the same time, at least part of the body portion 121 is located in the avoiding portion 23.

In this embodiment, as shown in FIG. 3, in the tab 12, the body portion 121 is attached to the side portion 114, and there is a gap between the extension portion 122 and the body portion 121 along the length direction X. Therefore, when the flow guiding component 2 abuts against the side portion 114, there is a risk of interference between the flow guiding component 2 and the body portion 121 of the tab 12. In this embodiment, by providing the flow guiding component 2 with an avoiding portion 23, the body portion 121 could be avoided, so that the flow guiding component 2 could be attached to the side portion 114 without being affected by the body portion 121, and thus the wettability of the flow guiding component 2 could be improved by the electrode assembly 1, and at the same time, the flow guiding component 2 does not interfere with the body portion 121, a size of the secondary battery in a length direction could be reduced, and energy density of the secondary battery could be increased. After the secondary battery is formed, at least part of the body portion 121 is located in the avoiding portion 23.

Specifically, as shown in FIG. 4 and FIG. 5, the avoiding portion 23 includes a recess provided on the flow guiding component 2. Along a height direction Z, the recess includes a first side wall 231 and a second side wall 232 disposed oppositely, and at least part of the body portion 121 is located in the recess. And along the height direction Z, the first side wall 231 and the second side wall 232 abut against the body portion 121, respectively.

Therefore, in this embodiment, the position of the flow guiding component 2 could be restricted along the height direction Z by the body portion 121 of the tab 12, and thereby the flow guiding component 2 could be prevented from moving along the height direction Z relative to the tab 12, and stability of the flow guiding component 2 could be improved in the secondary battery.

At the same time, as shown in FIG. 4 and FIG. 5, the recess includes a third side wall 233 along a width direction Y, and the third side wall 233 abuts against the body portion 121.

Therefore, in this embodiment, the position of the flow guiding component 2 could be restricted along the width direction Y by the body portion 121 of the tab 12, and thereby the flow guiding component 2 could be prevented from moving along the width direction Y relative to the tab 12, and further the stability of flow guiding component 2 could be improved in the secondary battery.

In addition, when the avoiding portion 23 is a recess, the body portion 121 may extend beyond the recess along a side far away from the third side wall 233, or the body portion may also be all located in the recess. Therefore, at least part of the body portion 121 is located in the recess.

In above embodiments, as shown in FIG. 4 and FIG. 5, the flow guiding component 2 has a plate-shaped structure, and along the width direction Y, one end surface of the flow guiding component 2 is attached to the side portion 114 of the electrode unit 11, and the other end surface is fixedly connected to the connecting component 3.

In this embodiment, contact area between the flow guiding component 2 of the plate-shaped structure and the side portion 114 is relatively large, so that a capability of the flow guiding component 2 to transport the electrolyte into the electrode assembly 1 could be improved, and thereby the service life of the secondary battery is further improved. At the same time, by fixedly connecting the flow guiding component 2 and the connecting component 3, the flow guiding component 2 could be fixed in the case 6, where the flow guiding component 2 and the connecting component 3 may be connected by gluing.

As shown in FIG. 2, along the width direction Y, a width of the flow guiding component 2 is smaller than a width of the connecting component 3, and at the same time, the width of the flow guiding component 2 is also smaller than a width of the corresponding side portion 114.

It can be understood that the larger the area of the flow guiding component 2, the greater the amount of the electrolyte it can absorb, and the larger the contact area between the flow guiding component 2 and the side portion 114, and the more the electrolyte it can transport into the electrode unit 11. Therefore, increasing the contact area between the flow guiding component 2 and the electrode unit 11 helps to improve the wettability of the electrode assembly 1. However, in order to ensure that the tab 12 and the connecting component 3 could be connected, the width of the flow guiding component 2 could not exceed the width of the connecting component 3. In this embodiment, the width of the flow guiding component 2 needs be as large as possible to increase the contact area between the flow guiding component 2 and the side portion 114 but avoid occupying too much space.

On the other hand, as shown in FIG. 7, along the height direction Z, a height of the flow guiding component 2 is greater than or equal to a height of the electrode assembly 1, so as to ensure that the electrolyte at the bottom of the case 6 could be transported to the electrode assembly 1 through the flow guiding component 2, and when the height of the flow guiding component 2 is equal to the height of the electrode assembly 1, the volume of the flow guiding component 2 could be reduced and the energy density of the secondary battery could be increased while the flow guiding component 2 could be ensured to have a high capability to transport the electrolyte.

In the secondary battery, the first connecting portion 31 and the second connecting portion 32 of the connecting component 3 are bent relative to each other. The first connecting portion 31 is configured to connect to the cap assembly 4, and the second connecting portion 32 is configured to connect to the tab 12 Therefore, the first connecting portion 31 and the second connecting portion 32 are bent at the top of the electrode assembly 1. Therefore, along the height direction Z, one end (upper end) of the flow guiding component 2 extends to a position where the first connecting portion 31 and the second connecting portion 32 are bent relative to each other, and the other end (lower end) abuts against the bottom of the case 6.

Or, when the secondary battery includes an insulating membrane 5, the insulating membrane 5 is located in the inner cavity of the case 6; and, along the height direction Z, the upper end of the flow guiding component 2 extends to the position where the first connecting portion 31 and the second connecting portion 32 are bent relative to each other, and the lower end abuts against the bottom of the insulating membrane 5.

Specifically, as shown in FIG. 8, the electrode unit 11 includes a plurality of anodic plates 111, a plurality of cathodic plates 112, and a plurality of separators 113. The separator 113 is located between adjacent anodic plate 111 and cathodic plate 112. The separator 113 is used to isolate the anodic plate 111 from the cathodic plate 112. In order to ensure complete isolation between the two plates, a size of the separator 113 is larger than a size of the anodic plate 111 and a size of the cathodic plate 112. As shown in FIG. 8, along the length direction X, the separator 113 has first end portions 113*a* extending beyond the anodic plate 111 and the cathodic plate 112, and a thickness of the flow guiding component 2 is greater than or equal to a distance between a first end portion 113*a* and a connecting component 3 corresponding thereto.

Since the first end portions 113*a* of the separator 113 extend beyond the anodic plate 111 and the cathodic plate 112, for the electrode unit 11, the first end portions 113*a* of the separator 113 are the most outer end along the width direction Y, and therefore, when the flow guiding component 2 is connected to the connecting component 3 and abuts against the electrode assembly 1, the flow guiding component 2 first contacts the first end portion 113a. When the thickness of the flow guiding component 2 is too small (less than the distance between the connecting component 3 and the first end portion 113a), the flow guiding component 2 cannot abut against the electrode assembly 1, or cannot be fixedly connected to the connecting component portion 3. Therefore, in order to achieve fixing the flow guiding component 2 in the secondary battery and transporting the electrolyte to the electrode unit 11, the thickness of the flow guiding component 2 is greater than or equal to the distance between the first end portion 113 a and the connecting component 3.

Further, as shown in FIG. 8, the electrode unit 11 includes a cathode and an anode, the flow guiding component 2 includes an anode flow guiding component 21 and a cathode flow guiding component 22, and the anode flow guiding component 21 is located on the anode side of the electrode unit 11, while the cathode flow guiding component 22 is located on the cathode side of the electrode unit 11. On the cathode side of the electrode unit 11, the cathodic plate 112 includes a third end portion 112a extending beyond the anodic plate 111, and along the width direction Y, the third end portion 112a portion is located between the first end portion 113a and the anodic plate 111, that is, the third end portion 112a extends beyond the anodic plate 111, but does not extend beyond the first end portion 113a of the separator 113.

A first thickness $D_1$ of the cathode flow guiding component 22 satisfies $D_1 \leq d_1+d_2$, where $d_1$ is the distance between a first end portion 113a and a connecting component 3 corresponding thereto, and $d_2$ is a distance between the third end portion 112a and a first end portion 113a that is close to the third end portion 112a. That is, the first thickness of the cathode flow guiding component 22 satisfies: $d_1 \leq D_1 \leq d_1+d_2$.

As described above, when the first thickness $D_1$ of the cathode flow guiding component 22 is smaller than $d_1$, the cathode flow guiding component 22 cannot contact with the electrode unit 11, and when the first thickness $D_1$ of the cathode flow guiding component 22 is greater than $d_1$, the cathode flow guiding component 22 contacts with the electrode unit 11 and then squeezes the separator 113, and when the first thickness $D_1$ of the cathode flow guiding component is too large ($D_1 > d_1+d_2$), the cathode flow guiding component 22 not only squeezes the separator 113, but also squeezes the third end portion 112a of the cathodic plate 112, causing that the cathodic plate 112 is bent inward (toward a center of the electrode assembly 1), which leads to that the cathodic plate 112 contacts with the anodic plate 111, thereby causing the cathode and anode of the electrode unit 11 to be short-circuited.

Therefore, in this embodiment, when the first thickness $D_1$ of the cathode flow guiding component 22 satisfies $d_1 \leq D_1 \leq d_1+d_2$, it could be ensured that the cathode flow guiding component 22 contacts with the cathode side of the electrode unit 11, while the cathodic plate 112 and the anodic plate 111 are prevented from being short-circuited.

At the same time, at the anode of the electrode unit 11, the anode plate 111 includes a second end portion 111a extending beyond the cathodic plate 112, and along the width direction Y, the second end portion 111a is located between the cathodic plate 112 and the first end portion 113a, that is, the first end 113a extends beyond the cathodic plate 112, but does not extend beyond the first end portion 113a of the separator 113.

A second thickness $D_2$ of the anode flow guiding component 21 satisfies $D_2 \leq d_1$ $d_3$, where $d_1$ is the distance between a first end portion 113a and a connecting component 3 corresponding thereto, and $d_3$ is a distance between the second end portion 111a and a first end portion 113a that is close to the second end portion 111a.

Similar to the cathode flow guiding component 22, when the second thickness of the anode flow guiding component 21 satisfies $d_1 \leq D_2 \leq d_1+d_2$, the anodic plate 111 on the anode side and the cathodic plate 112 could be prevented from being short-circuited, and it could be ensured that the anode flow guiding component 21 abuts against the anode side of the electrode unit 11.

It should be noted that the second thickness $D_2$ of the anode flow guiding component 21 and the first thickness $D_1$ of the cathode flow guiding component 22 may be the same or different, and specific values of $D_1$ and $D_2$ can be determined according to parameters of the anode side and the cathode side of the electrode unit.

In addition, a thickness d of the flow guiding component 2 satisfies the following formula:

$$d=(L_1 \times W_1 \times G - L_2 \times W_2 \times \rho_1)/(\rho_2 \times H_3 \times (W_3-1)) \quad (1)$$

where $L_1$ is a total length of the anodic plates 111, or a total length of the cathodic plates 112, and the total length of the anodic plates 111 refers to the total length of the anodic plates 111 after the electrode assembly 1 is spread, that is, a sum of the lengths of the anodic plates 111; $W_1$ is a width of an active material layer on the anodic plates 111 or a width of an active material layer on the cathodic plates 112, as shown in FIG. 8; as shown in FIG. 9, G is a distance between adjacent anodic plates 111, or a distance between adjacent cathodic plates 112; $L_2$ is a total length of the separators 113, which represent, the total length of the separators 113 after the electrode assembly 1 is spread, that is a sum of the lengths of the separators 113; $W_2$ is a width of the separators 113, as shown in FIG. 8; $H_3$ is a height of the electrode assembly 1, as shown in FIG. 6; $W_3$ is a width of the connecting component 3, as shown in FIG. 4; $\rho_1$ is a liquid retention coefficient of the separators 113; $\rho_2$ is a liquid retention coefficient of the flow guiding component 2.

As described above, each parameter in formula (1) is a measurable parameter or a known parameter, and the thickness d of the flow guiding component 2 can be calculated by this formula.

Embodiments of the present application also provide a battery pack, including a secondary battery described in a foregoing embodiment.

Embodiments of the present application also provide an electric device, including a secondary battery described in a foregoing embodiment, where the secondary battery is used to provide electrical energy, and the device may be a vehicle or an energy storage device.

The above description is only preferred embodiments of the present application, and is not intended to limit the application. Any modification, equivalent replacement, improvement, etc. made within the spirit and principle of the present application shall be included in the scope of protection of the present application.

What is claimed is:

1. A secondary battery, comprising:
   a case comprising an opening and an inner cavity, an electrolyte being comprised in the inner cavity;
   a cap assembly covering the opening;
   an electrode assembly located in the inner cavity and comprising an electrode unit and tabs; along a length direction, the electrode unit comprising two side portions disposed oppositely, and the tabs extending from the side portions;

connecting components configured to connect the tabs and the cap assembly; and a flow guiding component located between a corresponding connecting component and a corresponding side portion and connected to the corresponding connecting component, at least part of the flow guiding component being in contact with the corresponding side portion, and the flow guiding component being in contact with the electrolyte, wherein the flow guiding component is provided with an avoiding portion configured to avoid the tabs, and along a height direction, a height of the flow guiding component is greater than or equal to a height of the electrode assembly and the flow guiding component is configured to guide electrolyte at a bottom of the base to the electrode assembly.

2. The secondary battery according to claim 1, wherein: each of the tabs comprises a body portion and an extension portion, the body portion extending from the corresponding side portion, and the extension portion being bent relative to the body portion; and at least part of the body portion being located in the avoiding portion.

3. The secondary battery according to claim 2, wherein: the avoiding portion is a recess;

along a height direction, the recess comprises a first side wall and a second side wall disposed oppositely, and the first side wall and the second side wall abut against the body portion, respectively; and along a width direction, the recess comprises a third side wall, and the third side wall abuts against the body portion.

4. The secondary battery according to claim 1, wherein: the flow guiding component is a plate-shaped structure; and along a width direction, one end of the flow guiding component is fixedly connected to the corresponding connecting component, and the other end is attached to the corresponding side portion.

5. The secondary battery according to claim 1, wherein: along a width direction, a width of the flow guiding component is smaller than a width of the connecting components.

6. The secondary battery according to claim 1, wherein: each of the connecting components comprises a first connecting portion and a second connecting portion, the first connecting portion being configured to connect to the cap assembly, the second connecting portion being configured to connect to a tab, and the first connecting portion being bent relative to the second connecting portion;

along a height direction, one end of the flow guiding component extends to a position where the first connecting portion and the second connecting portion are bent relative to each other, and the other end of the flow guiding component abuts against a bottom of the case; or, the secondary battery further comprises an insulating membrane located between the case and the electrode assembly, and along a height direction, one end of the flow guiding component extends to a position where the first connecting portion and the second connecting portion are bent relative to each other, and the other end of the flow guiding component abuts against a bottom of the insulating membrane.

7. The secondary battery according to claim 1, wherein: the electrode assembly comprises a plurality of anodic plates, a plurality of cathodic plates, and a plurality of separators, and the separators are located between the anodic plates and the cathodic plates that are adjacent;

along a width direction, each of the separators comprises first end portions that extend beyond the anodic plates and the cathodic plates; and a thickness of the flow guiding component is greater than or equal to a distance between a first end portion and a connecting component corresponding thereto.

8. The secondary battery according to claim 7, wherein: the flow guiding component comprises an anode flow guiding component and a cathode flow guiding component, wherein the anode flow guiding component and the cathode flow guiding component are respectively located on two sides of the electrode assembly along the width direction;

at a cathode of the electrode assembly, each of the cathodic plates comprises a third end portion that extends beyond the anodic plates, and along the width direction, the third end portion is located between a first end portion and the anodic plates; and a first thickness $D_1$ of the cathode flow guiding component satisfies $D_1 \leq d_1 + d_2$;

wherein $d_1$ is the distance between a first end portion and a connecting component corresponding thereto, and $d_2$ is a distance between the third end portion and a first end portion that is close to the third end portion.

9. The secondary battery according to claim 7, wherein: the flow guiding component comprises an anode flow guiding component and a cathode flow guiding component, wherein the anode flow guiding component and the cathode flow guiding component are respectively located on two sides of the electrode assembly along the width direction;

at an anode of the electrode assembly, each of the anodic plates comprises a second end portion that extends beyond the cathodic plates, and along the width direction, the second end portion is located between the cathodic plates and the first end portion; and a second thickness $D_2$ of the anode flow guiding component satisfies $D_2 \leq d_1 + d_3$;

wherein $d_1$ is the distance between a first end portion and a connecting component corresponding thereto, and $d_3$ is a distance between the second end portion and a first end portion that is close to the second end portion.

10. The secondary battery according to claim 7, wherein: a thickness d of the flow guiding component satisfies a following formula:

$$d = (L_1 \times W_1 \times G - L_2 \times W_2 \times \rho_1) / (\rho_2 \times H_3 \times (W_3 - 1)) \tag{1}$$

wherein $L_1$ is a total length of the anodic plates or a total length of the cathodic plates; $W_1$ is a width of an active material layer of the anodic plates or a width of an active material layer of the cathodic plates;

G is a distance between the anodic plates that are adjacent, or a distance between the cathodic plates that are adjacent;

$L_2$ is a total length of the separators; $W_2$ is a width of the separators;

$H_3$ is a height of the electrode assembly; $W_3$ is a width of the connecting components; and $\rho_1$ is a liquid retention coefficient of the separators; $\rho_2$ is a liquid retention coefficient of the flow guiding component.

11. A battery pack, comprising: a secondary battery according to claim 1.

12. An electric device, comprising: a secondary battery according to claim 1, the secondary battery being used to provide electrical energy.

\* \* \* \* \*